US008632033B2

(12) United States Patent
Somerfield et al.

(10) Patent No.: US 8,632,033 B2
(45) Date of Patent: Jan. 21, 2014

(54) THRUST REVERSER ACTUATION

(75) Inventors: Michael Paul Somerfield, Stoke-on-Trent (GB); Benjamin Thomas Tucker, Wolverhampton (GB)

(73) Assignee: Goodrich Actuation Systems Limited (GB)

( * ) Notice: Subject to any disclaimer, the term of this patent is extended or adjusted under 35 U.S.C. 154(b) by 553 days.

(21) Appl. No.: 12/893,494

(22) Filed: Sep. 29, 2010

(65) Prior Publication Data

US 2011/0232406 A1 Sep. 29, 2011

(30) Foreign Application Priority Data

Sep. 29, 2009 (GB) .................................. 0917065.5

(51) Int. Cl.
*F02K 1/54* (2006.01)
*F16H 3/06* (2006.01)
*F16H 27/02* (2006.01)
*F16H 29/02* (2006.01)
*F16H 29/20* (2006.01)

(52) U.S. Cl.
USPC ..................................... 244/110 B; 74/89.39

(58) Field of Classification Search
USPC ................ 244/110 B; 74/89.23, 89.37, 89.39
See application file for complete search history.

(56) References Cited

U.S. PATENT DOCUMENTS

| | | | | |
|---|---|---|---|---|
| 3,596,740 A | * | 8/1971 | Nau | 188/74 |
| 4,898,265 A | * | 2/1990 | Metcalf | 192/223.3 |
| 6,202,803 B1 | * | 3/2001 | Lang | 188/134 |
| 6,526,744 B2 | * | 3/2003 | Ahrendt | 60/204 |
| 6,974,107 B2 | * | 12/2005 | Christensen et al. | 244/101 |
| 7,919,938 B2 | * | 4/2011 | Harvey et al. | 318/14 |
| 2003/0006119 A1 | * | 1/2003 | Harvey | 192/141 |
| 2003/0070416 A1 | | 4/2003 | Johnson et al. | |
| 2004/0118974 A1 | * | 6/2004 | Colotte et al. | 244/110 B |

FOREIGN PATENT DOCUMENTS

| | | |
|---|---|---|
| EP | 1673529 | 12/2004 |
| EP | 1972548 | 9/2008 |
| EP | 1978233 | 10/2008 |
| GB | 2408725 | 6/2005 |
| GB | 2418719 | 4/2006 |
| WO | 2004113707 | 12/2004 |

OTHER PUBLICATIONS

European Search Report dated Oct. 25, 2012.
British Search Report dated Jan. 26, 2010.

* cited by examiner

*Primary Examiner* — Justin Krause
(74) *Attorney, Agent, or Firm* — Cantor Colburn LLP

(57) ABSTRACT

A thrust reverser drive arrangement for driving a thrust reverser cowl for movement relative to first and second guide tracks is described which comprises a first actuator located, in use, close to the first guide track, a second actuator located, in use, close to the second guide track, and a third actuator, the actuators being arranged to be driven in synchronism and at the same speed by a drive motor to drive the cowl for movement, the third actuator being of smaller size and/or weight than the first and second actuators, and wherein the third actuator is provided with a load limiter to limit the transmission of loads through the third actuator in the event that the third actuator is subject to a compressive loading greater than a predetermined level. The invention further relates to a load limiter device suitable for use in such an arrangement.

8 Claims, 4 Drawing Sheets

THRUST REVERSER ACTUATION

This invention relates to thrust reverser actuation and in particular to a drive arrangement suitable for use in driving a movable component, for example a cowl, of a thrust reverser system between stowed and deployed positions.

A typical thrust reverser system includes a pair of movable cowls, each being movable between a stowed position and a deployed position in which it is exposed to the airflow through the aircraft engine with which it is associated to apply a braking load to the aircraft. Each cowl is guided for movement along a pair of guide tracks, and is driven for movement by a plurality of linearly extendable actuators, for example in the form of screw jack actuators. Usually an actuator will be located relatively close to each of the guide tracks, and one or more intermediate actuators will be positioned between the aforementioned actuators. The actuators are arranged to be driven in synchronism, conveniently by a single motor, drive from which is transmitted to all of the actuators, typically by flexible drive shafts.

In use, during deployment, the actuators are driven to move the cowl from its stowed position towards its deployed position. Initially, each actuator will be under compression as it operates to drive the cowl for movement. After initial movement of the cowl into the airflow, the aerodynamic forces on the cowl will tend to drag the cowl towards its deployed position, placing the actuators under tension. In order to avoid uncontrolled movement of the cowl under these circumstances which could result in damage to the cowl, the actuators and/or to the drive motor and associated circuits, each actuator typically includes a so-called no-back device which serves to apply a braking load to the actuator, resisting extension thereof, and thus stopping or slowing the movement of the cowl. The gain of the no-back device is typically slightly greater than unity so as to ensure that the braking load applied by the no-back device as a result of the application of a given tensile loading is larger than that required to avoid extension of the actuator as a result of the application of that tensile loading.

It is desirable to optimise the designs of the actuators in order to avoid unnecessary weight being carried by the aircraft. The actuators are typically designed in such a manner as to be able to withstand the maximum loadings applied to the cowl which typically occur in the event of a fan blade failure in the associated engine. As the actuators closest to the guide tracks are sized to withstand the structural loads in such circumstances, it is known to use larger, stronger actuators in these positions to bear such loads, and to make some weight savings by using smaller, lighter weight actuators in the intermediate positions, where the loadings may be smaller. The lighter weight actuators are less strong and so are only able to bear smaller loadings before sustaining permanent damage.

In the event of a failure of the actuator or disconnect in the transmission of drive to the actuator located adjacent one of the guide tracks, during deployment, the continued movement of the cowl due to the operation of the other actuators will place the undriven or failed actuator under tension. The no-back in that actuator will then serve to resist further movement of the cowl. The continued transmission of drive to the remaining actuators will result in the cowl becoming skewed, pivoting about the mounting by which the cowl is connected to the undriven actuator. As such pivoting movement due to lever action requires the actuator adjacent the other guide track to extend by a greater distance than the intermediate actuator, and the operation of the actuators is synchronised so this is not permitted, the actuator adjacent that guide track will also be placed under tension and its no-back will resist extension. The overall effect of this is that, temporarily, all of the output torque of the drive motor in addition to further loads reflected from the locked actuators though lever action of the cowl is applied to the intermediate actuator which will be in compression. This actuator is not designed to bear such an operating overload and there is a risk of permanent damage occurring thereto. For example, its output shaft could be buckled.

Obviously this is undesirable and it is an object of the invention to provide an arrangement whereby these disadvantages are overcome or are of reduced effect.

It is known to incorporate a torque limiter device which releases upon the application of an excessive torque thereto into an actuator. For example, WO2004/113707 describes a design of actuator in which a torque limiter assembly is incorporated to limit the torque applied to the actuator.

GB2408725 and EP1972548 both describe actuator schemes in which a plurality of actuators are provided.

According to the present invention there is provided a thrust reverser drive arrangement for driving a thrust reverser cowl for movement relative to first and second guide tracks, the drive arrangement comprising a first actuator located, in use, close to the first guide track, a second actuator located, in use, close to the second guide track, and a third actuator, the actuators being arranged to be driven in synchronism and at the same speed by a drive motor to drive the cowl for movement, and wherein the third actuator is provided with a load limiter to limit the transmission of loads through the third actuator in the event that the third actuator is subject to a compressive loading greater than a predetermined level.

Advantageously, the third actuator may be of smaller size and/or weight than the first and second actuators.

With such an arrangement, in the event of a failure of the nature outlined hereinbefore the load limiter will serve to limit the loadings transmitted through the third actuator, preferably reacting or earthing excess loadings through the housing of the third actuator, thereby reducing the risk of permanent damage to the third actuator.

The third actuator conveniently comprises a rotatable actuator member, rotatable by the motor, in use, the actuator member being coupled through a ball or roller-screw coupling to an output member, rotation of the actuator member driving the output member for axial movement, the load limiter being operable to apply a braking load to the actuator member to resist rotation thereof, thereby reacting applied torque to the housing of the third actuator.

The load limiter conveniently comprises bearing means supporting the actuator member for rotary motion relative to the housing, resilient biasing means permitting limited axial movement of the actuator member in the event of the application of excessive loadings to the actuator, and abutment means co-operable in the event of axial movement of the actuator member beyond a predetermined distance to transmit torque loadings between the actuator member and the housing.

The abutment means preferably comprises a first stop member secured, in use, to the actuator member and co-operable with a first abutment surface associated with the housing, and a second stop member secured, in use to the actuator member and co-operable with a second abutment surface associated with the housing. The bearing means is conveniently located between the first and second stop members, and the resilient biasing means conveniently comprises first and second disc spring packs interposed between the bearing means and the first and second stop members, respectively.

The first and second stop members are preferably each provided with fingers, the fingers of the first stop member being interleaved with those of the second stop member, the bearing means encircling the fingers, each finger including a lip at its free end co-operable with the bearing means to hold the first and second stop members captive to the bearing means.

Such a design of load limiter is advantageous in that it can be pre-assembled and tested, if desired, prior to introduction into the actuator.

The invention further relates to a load limiter device comprising a first stop member, a second stop member, bearing means, and resilient biasing means interposed between the bearing means and the first and second stop means, and retainer means whereby the first and second stop members are held captive to the biasing means.

The retainer means conveniently comprises a series of fingers associated with the first stop member interleaved with a series of fingers associated with the second stop member, the bearing means encircling the fingers, each finger including a lip at its free end which is co-operable with the bearing means.

The invention will further be described, by way of example, with reference to the accompanying drawings, in which.

Figure 1:
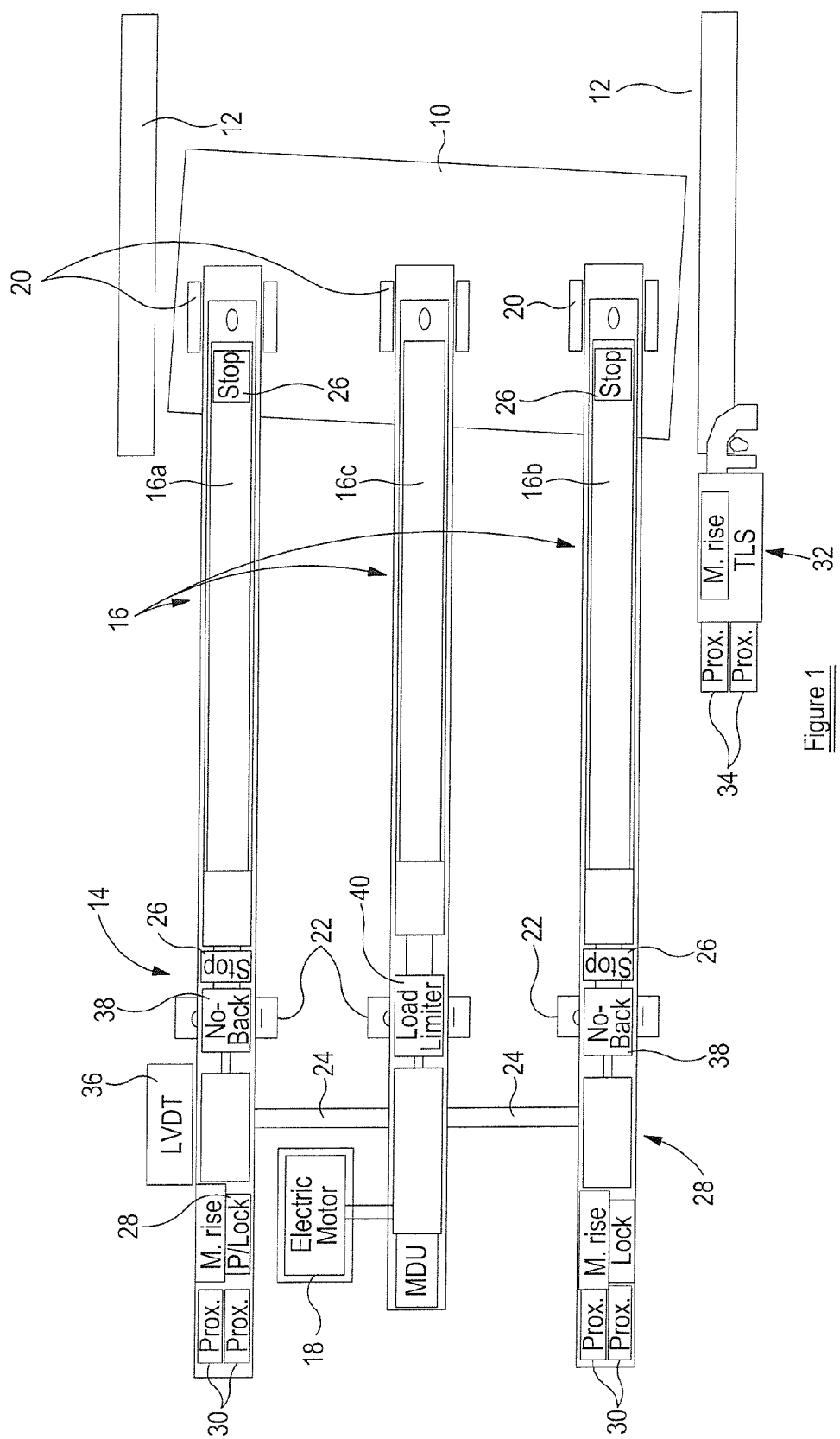
FIG. 1 is a diagrammatic representation of part of a thrust reverser system including a drive arrangement in accordance with one embodiment of the invention.

FIG. 1 illustrates, diagrammatically, part of a thrust reverser system for use with an aircraft. The thrust reverser system comprises a cowl 10 guided for movement relative to an aircraft engine by a pair of guide tracks 12. The cowl 10 is arranged to be driven for movement along the guide tracks 12 by a drive arrangement 14 which comprises three linear actuators 16 arranged to be driven by a single, common electric motor 18. Each actuator 16 is in the form of a screw-jack actuator.

A first one of the actuators 16, actuator 16a, is located adjacent one of the tracks 12, a second one of the actuators 16, actuator 16b, being located adjacent the other of the tracks 12. Intermediate the first and second actuators 16a, 16b is located a third, intermediate actuator 16c. Each actuator 16 is secured by a respective mounting 20 to the cowl 10, and is also secured by gimbal mounting means 22 to a fixed part of the engine housing or wing structure (not shown).

The electric motor 18 is arranged to drive the third actuator 16c directly, and flexible drive transmission shafts 24 are arranged to transmit drive from the third actuator 16c to the first and second actuators 16a, 16b.

The first and second actuators 16a, 16b are substantially identical to one another and incorporate stops 26 operable to limit extending and retracting movement of the actuators 16a and 16b, lock arrangements 28 operable to lock these actuators against movement, and sensors 30 operable to output signals indicative of the operating status of the lock arrangements 28 to an associated control unit (not shown).

The thrust reverser system further comprises a track lock or tertiary lock 32 operable to lock the cowl 10 against movement relative to one of the tracks 12, the track lock 32 having sensors 34 associated therewith to output signals representative of the status of the track lock 32 to the control unit.

A position sensor in the form of an RVDT or an LVDT 36 monitors the operation of one of the actuators 16 to provide a signal indicative of the position of the actuators 16 and hence the cowl 10 for use by the control unit.

It is apparent from FIG. 1 that the third actuator 16c is of a different design to the first and second actuators 16a, 16b. This arises from the fact that the loadings experienced by the third actuator 16c are considerably smaller than those experienced by the first and second actuators 16, 16b, in normal use. As a consequence, the third actuator 16c can be of reduced size and weight compared to the first and second actuators 16a, 16b, thereby achieving a weight saving. There is also no need to provide the third actuator 16c with the stops 26, lock 28 or associated sensors 30, thereby achieving further weight and cost savings. As mentioned hereinbefore, the third, smaller and/or lighter actuator 16c is capable of withstanding smaller loadings than can be withstood by the first and second actuators 16a, 16b.

In use, when deployment of the cowl 10 is required, the track lock 32 and locks 28 are instructed to release, and the outputs of the sensors 30, 34 are used by the control unit to determine that the system is unlocked. The motor 18 is then operated to drive the actuators 16, and hence the cowl 10, for movement.

As outlined hereinbefore, in use, when the cowl 10 is being moved from a stowed position to a deployed position the motor 18 is driven to cause an extension of all three of the actuators 16, thereby driving the cowl 10 for movement. During the initial part of the movement of the cowl the actuators 16 are under compression, the actuators 16 having to positively drive the cowl 10 for movement. However, after the cowl 10 has been moved into the air flow through the associated engine, the aerodynamic loads on the cowl 10 will tend to drag the cowl 10 towards its deployed position, placing the actuators 16 under tension. In order to ensure that movement of the cowl 10 continues in a controlled manner, the first and second actuators 16a, 16b are each provided with a no-back device 38 operable to apply a braking load when the actuators 16a, 16b are under tension, the braking load being operable to resist such movement of the cowl 10 and thereby ensure that further movement of the cowl 10 occurs in a controlled manner.

As outlined hereinbefore, the provision of the first and second actuators 16a, 16b with no-back devices 38, especially when the third actuator 16c is of reduced size and weight compared to the first and second actuators 16a, 16b, may result, under certain failure conditions, in permanent damage occurring in the third actuator 16c. In order to reduce the risk of such permanent damage occurring, a load limiter device 40 is incorporated into the third actuator 16c. The load limiter device 40 is arranged such that if the third actuator 16c experiences a compressive load higher than a predetermined level (set at a level higher than would be expected during normal operation), the load limiter device 40 applies a braking load to part of the actuator to prevent continued operation of the motor from continuing to increase the compression of the third actuator 16c. By preventing such additional increases in the applied compressive load it will be appreciated that the risk of damage to the actuator is reduced.

In normal use the loadings experienced by the third actuator 16c are below the level where the load limiter 40 is active. Deployment and retraction of the cowl 10 thus occurs under the control of the electric motor 18, the no-back devices 38 operating to resist aiding movement of the cowl.

In the event of a failure in the transmission of drive to one of the first and second actuators 16a, 16b (denoted in FIG. 1 by the break in one of the drive shafts 24) which results in that actuator, in this case actuator 16b, no longer being driven, the continued operation of the electric motor will result in the first and third actuators 16a, 16c continuing to be driven at the same speed as one another in a synchronised manner, and thus limited further translational movement of the cowl 10 along the tracks 12 will occur. Such movement of the cowl 10 will place the second actuator 16b under tension and the no-back device 38 thereof will operate to resist further extension of the second actuator 16b. As, in these circumstances, further translational movement of the cowl 10 is no longer permitted, the continued operation of the motor 18 to extend the first and third actuators 16a, 16c will result in the cowl 10 tending to pivot about the mounting 20 by which the cowl 10 is secured to the second actuator 16b due to lever action. As such pivotal movement of the cowl 10 requires greater extension of the first actuator 16a than of the third actuator 16c, and this is not permitted by virtue of the synchronisation of the actuators by the drive shafts 24, the first actuator 16a will also be subject to tensile loads whilst the third actuator 16c will be under compression. The tensile loading of the first actuator 16a results in its no-back device 38 operating to resist extension thereof and under these circumstances the entire output torque from the electric motor 18 and the reflected load from the locked actuators would, in prior arrangements, be experienced by the third actuator 16c and converted by the screw-jack coupling thereof to a linear output force, thus there would be the risk of permanent damage occurring thereby. However, in accordance with the invention the third actuator 16c is provided with the load limiter device 40 whereby, once the output compressive force exceeds a predetermined level, at least part of the output torque applied to the actuator is reacted to the housing of the actuator 16c. The overall load transmitted through the actuator 16c to the cowl 10 is thus reduced, avoiding the situation where the full output loading of the motor has to be accommodated by the entire actuator and so the risk of permanent damage of parts thereof is reduced.

Figure 2:
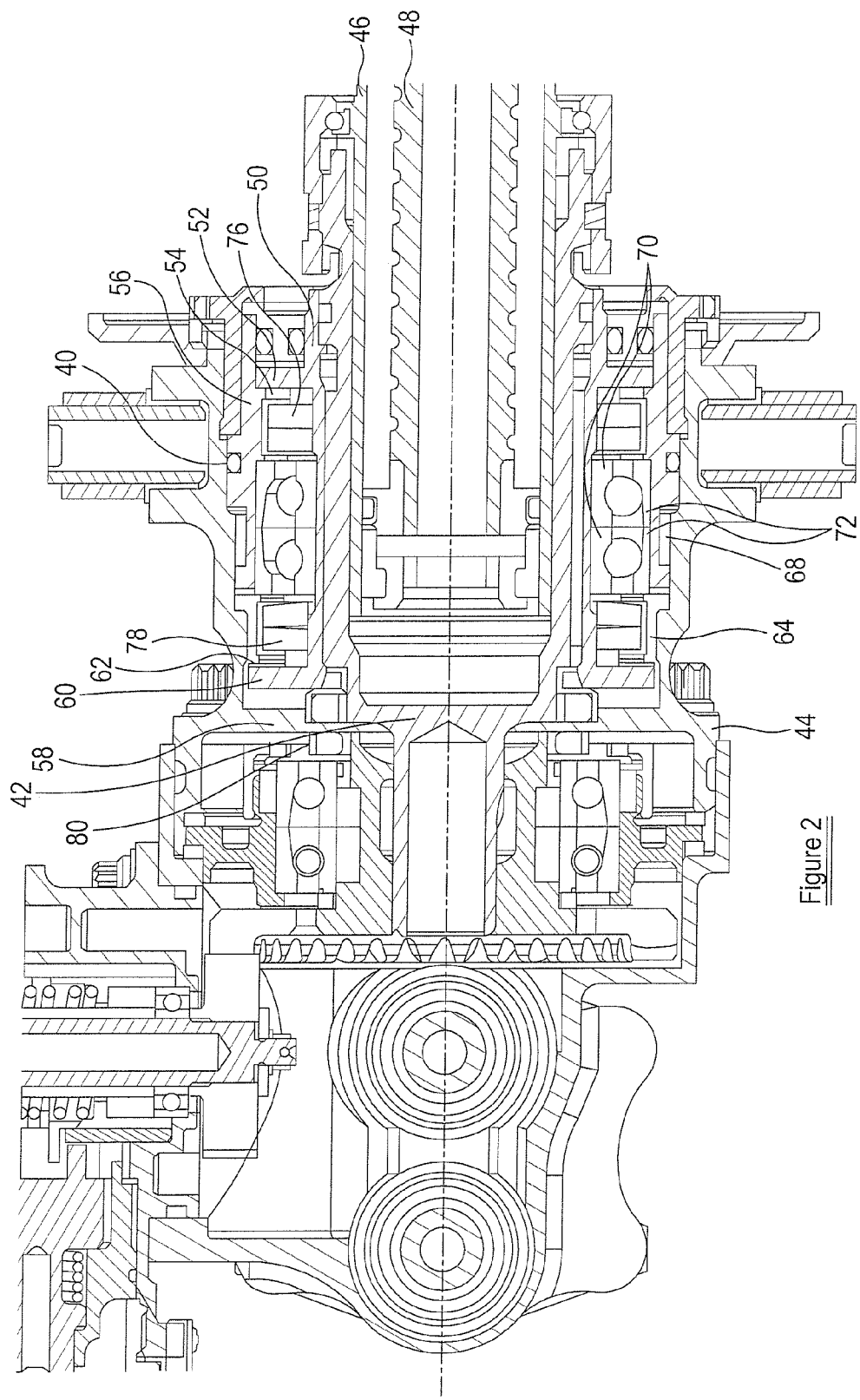
FIG. 2 is a sectional view illustrating part of one of the actuators of the arrangement of FIG. 1.

The third actuator 16c is conveniently of the form illustrated in FIG. 2. The actuator shown in FIG. 2 comprises a rotatable actuator member 42 supported for rotation within a housing 44. The actuator member 42 includes a region 46 of tubular form having, at an end thereof, a threaded nut (not shown) secured through a ball or roller-screw coupling to a threaded output shaft 48. The output shaft 48 is secured to the associated mounting 20 in such a manner that the output shaft 48 is unable to rotate. It will be appreciated that, in use, rotation of the actuator member 42 under the control of the electric motor 18 results in axial displacement of the output shaft 48 relative to the housing 44, and thus results in displacement of the cowl 10, in use.

The load limiter device 40 is interposed between the tubular part 46 of the rotary actuator member 42 and the housing 44. The load limiter device 40 comprises a first stop member 50 which is secured to the rotary actuator member 42 so as to be rotatable therewith and to be axially fixed relative to the rotary actuator member 42, in use, by being abutted against a shoulder formed thereon. A key, spline or other connection arrangement may be used to ensure that rotary movement of the first stop member 50 relative to the rotary actuator member 42 is not permitted. The first stop member 50 includes a radially outwardly extending flange 52 which, in the position illustrated in FIG. 2, is spaced by a small distance from an abutment surface 54 of an abutment member 56 rigidly secured to the housing 44.

A second stop member 58 is also secured to the rotary actuator member 42 in such a manner that rotary movement thereof relative to the actuator member 42 is not permitted. This is conveniently achieved by a spline, key or other similar coupling. The second stop member 58 includes a radially outwardly extending flange 60 which in the position illustrated in FIG. 2 is spaced by a small distance from a second abutment surface 62 of an abutment member 64 also rigidly secured to the housing 44.

Figure 3:
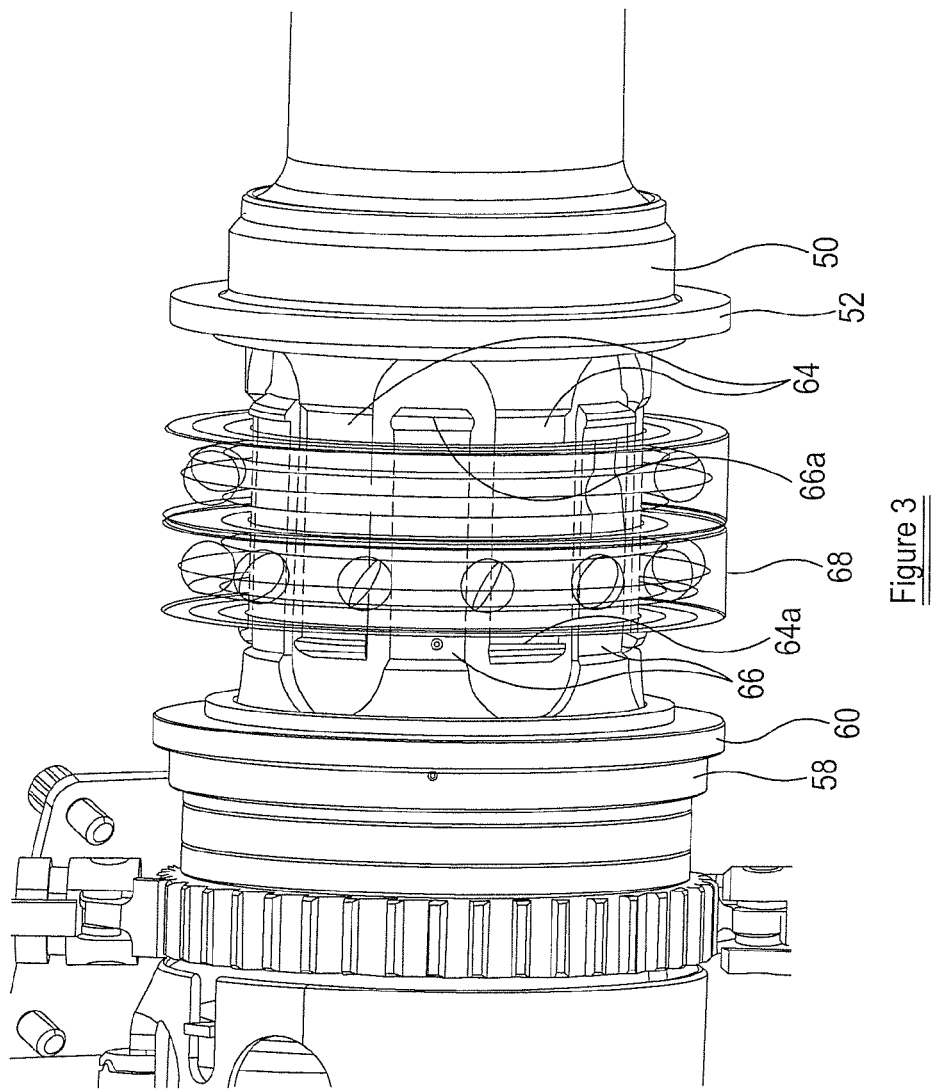
FIG. 3 illustrates part of the load limiter of the actuator of FIG. 2.

As best shown in FIG. 3, the first stop member 50 includes a series of fingers 64 which are interleaved with similar fingers 66 provided on the second stop member 58. Bearing means 68 encircle the fingers 64, 66, the bearing means 68 comprising inner races 70 supported on the fingers 64, 66 for rotation therewith, outer races 72 secured to the fixed abutment member 56, and ball bearings 74 located therebetween.

The fingers 64, 66 are provided, at their free ends, with outwardly extending lips 64a, 66a which are engageable with the inner races 70 to hold the first and second stop members 50, 58 captive to the bearing means 68.

Resilient biasing means in the form of first and second disc spring packs 76, 78 are located between the flanges 52, 60 of the first and second stop members 52, 58 respectively, and the bearing means 68. The biasing means urges the second stop member 58 against a stop 80 secured to the actuator member 46, and the first stop member 50 against the associated shoulder on the actuator member 46.

In normal use, the biasing means serves to hold the rotary actuator member 46 in a substantially fixed axial position relative to the housing 44, the bearing means 68 supporting the actuator member 46 for rotation.

Figure 4:
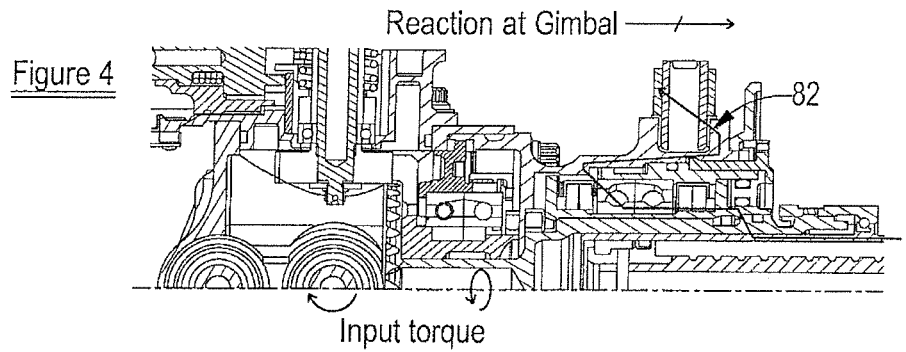
FIGS. 4 to 7 are diagrams illustrating various operating conditions of the actuator of FIG. 2.
Figure 5:
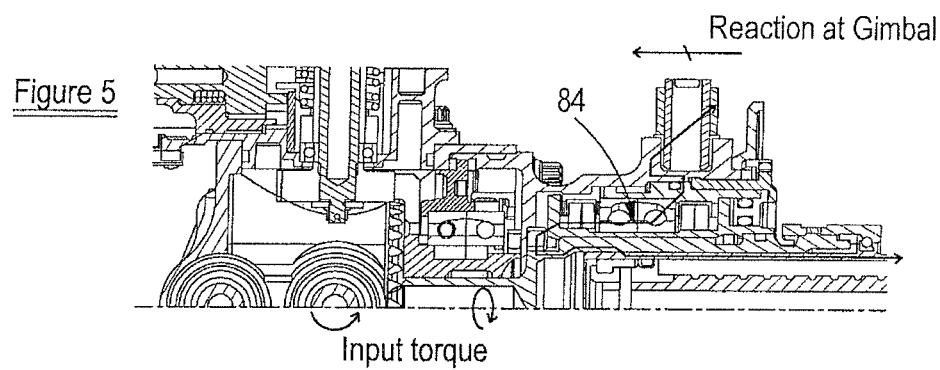

If, during movement of the cowl 10 the actuator 16c is under compression or tension at levels sufficiently low that the accompanying axial movement of the actuator member 46 against the net biasing load applied by the biasing means does not result in co-operation between either of the stop members 52, 58 and the associated abutment surfaces 54, 62, then the compressive or tensile load is reacted through the biasing means and bearing means 68 to the housing 44, but the load limiter device 40 does not operate to resist rotation of the actuator member 46. These operating conditions are illustrated in FIGS. 4 and 5, FIG. 4 illustrating the load path 82 by which compressive loads are reacted to the housing and FIG. 5 illustrating the load path 84 by which tensile loads are reacted to the housing.

Figure 6:
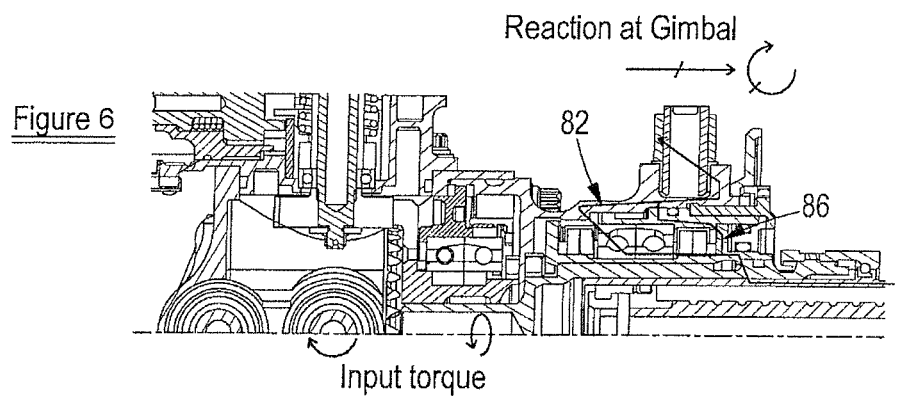

If larger compressive or tensile loads are experienced, sufficient to cause significant axial movement of the actuator member 46 relative to the housing 44 against the action of the biasing means then the load limiter device 40 will operate to react torque between the actuator member 46 and the housing 44. FIG. 6 illustrates the case where a large magnitude compressive load is experienced, as would occur in the failure mode outlined hereinbefore due to the very high torque being applied to the actuator. In such a situation, the compressive load is sufficient to move the actuator member 46 to the left, in the orientation illustrated, against the net biasing load applied by the biasing means to a position in which the flange 52 of the first stop member 50 abuts the first abutment surface 54 of the abutment member 56 which is secured to the housing. As the first stop member 50 is, effectively, axially and rotationally fixed to the actuator member 46, the co-operation between the flange 52 and the first abutment surface 54 serves to react both input torque and additional compressive loads between the actuator member 46 and the housing 44. This load path is identified in FIG. 6 as load path 86, and it will be apparent that this load path is in addition to the load path 82.

Figure 7:
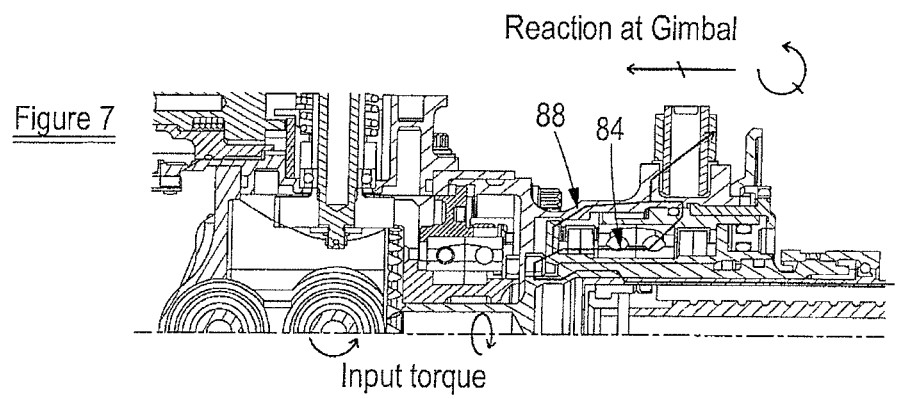

FIG. 7 illustrates the case where a large tensile load is applied, illustrating a load path 88 which serves, in addition to load path 84, to react tensile loadings, and additionally to react torque loadings to the housing 44.

In both cases, as torque is reacted or earthed to the housing 44, it will be appreciated that the load limiter device 40 operates as a brake, resisting rotation of the actuator member 46 when the tensile load or compressive load exceeds a predetermined level. As a result, the application of excessive compressive loads via the output shaft 48 as would otherwise occur in the failure mode outlined hereinbefore is avoided and so the risk of permanent damage to the actuator is reduced. It will be appreciated that this manner of operation is quite different to the operation of a torque limiter which releases upon the application of an excessive torque thereto.

The specific form of load limiter device 40 illustrated in FIGS. 2 to 7 is advantageous in that, as the first and second stop members are held captive to the bearing means, the load limiter device 40 can be pre-assembled and tested as a module prior to mounting on the actuator. However, the invention is not restricted to the use of this specific type of load limiter device.

The arrangement described hereinbefore is merely one embodiment of the invention and it will be appreciated that a wide range of modifications and alterations may be made without departing from the scope of the invention.

The invention claimed is:

1. A thrust reverser drive arrangement for driving a thrust reverser cowl for movement relative to first and second guide tracks, the drive arrangement comprising:
a first actuator located, in use, close to the first guide track, a second actuator located, in use, close to the second guide track, and a third actuator, the actuators being arranged to be driven in synchronism and at the same speed by a drive motor to drive the cowl for movement, and wherein the third actuator is provided with a load limiter to limit the transmission of loads through the third actuator in the event that the third actuator is subject to a compressive loading greater than a predetermined level
wherein the third actuator is of smaller size and/or weight than the first and second actuators;
wherein excess loadings are reacted by the load limiter through the housing of the third actuator; and
wherein the third actuator comprises a rotatable actuator member, rotatable by the motor, in use, the actuator member being coupled through a ball or roller-screw coupling to an output member, rotation of the actuator member driving the output member for axial movement, the load limiter being operable to apply a braking load to the actuator member to resist rotation thereof, thereby reacting applied torque to the housing of the third actuator.

2. An arrangement according to claim 1, wherein the load limiter comprises bearing means supporting the actuator member for rotary motion relative to the housing, resilient biasing means permitting limited axial movement of the actuator member in the event of the application of excessive loadings to the actuator, and abutment means co-operable in the event of axial movement of the actuator member beyond a predetermined distance to transmit torque loadings between the actuator member and the housing.

3. An arrangement according to claim 2, wherein the abutment means comprises a first stop member secured, in use, to the actuator member and co-operable with a first abutment surface associated with the housing, and a second stop member secured, in use to the actuator member and co-operable with a second abutment surface associated with the housing.

4. An arrangement according to claim 3, wherein the bearing means is located between the first and second stop members.

5. An arrangement according to claim 3, wherein the resilient biasing means comprises first and second disc spring packs interposed between the bearing means and the first and second stop members, respectively.

6. An arrangement according to claim 3, further comprising retainer means whereby the first and second stop members are held captive to the bearing means.

7. An arrangement according to claim 6, wherein the retainer means comprises a series of fingers associated with the first stop member interleaved with a series of fingers associated with the second stop member, the bearing means encircling the fingers, each finger including a lip at its free end which is co-operable with the bearing means.

8. A thrust reverser drive arrangement for driving a thrust reverser cowl for movement relative to first and second guide tracks, the drive arrangement comprising:
a first actuator located, in use, close to the first guide track, a second actuator located, in use, close to the second guide track, and a third actuator, the actuators being arranged to be driven in synchronism and at the same speed by a drive motor to drive the cowl for movement, and wherein the third actuator is provided with a load limiter to limit the transmission of loads through the third actuator in the event that the third actuator is subject to a compressive loading greater than a predetermined level;
wherein the third actuator is of smaller size and/or weight than the first and second actuators;
wherein excess loadings are reacted by the load limiter through the housing of the third actuator;
wherein the third actuator comprises a rotatable actuator member, rotatable by the motor, in use, the actuator member being coupled through a ball or roller-screw coupling to an output member, rotation of the actuator member driving the output member for axial movement, the load limiter being operable to apply a braking load to the actuator member to resist rotation thereof, thereby reacting applied torque to the housing of the third actuator;
wherein the load limiter comprises bearing means supporting the actuator member for rotary motion relative to the housing, resilient biasing means permitting limited axial movement of the actuator member in the event of the application of excessive loadings to the actuator, and abutment means co-operable in the event of axial movement of the actuator member beyond a predetermined distance to transmit torque loadings between the actuator member and the housing;
wherein the abutment means comprises a first stop member secured, in use, to the actuator member and co-operable with a first abutment surface associated with the housing, and a second stop member secured, in use to the actuator member and co-operable with a second abutment surface associated with the housing; and
retainer means whereby the first and second stop members are held captive to the bearing means, wherein the retainer means comprises a series of fingers associated with the first stop member, interleaved with a series of fingers associated with the second stop member, the bearing means encircling the fingers, each finger including a lip at its free end which is co-operable with the bearing means.

* * * * *